United States Patent Office 3,352,926
Patented Nov. 14, 1967

3,352,926
PEROXIDE CATALYSTS AND POLYMERIZATION PROCESSES EMPLOYING THE SAME
James E. Guillet and Edmund B. Towne, Kingsport, Tenn., assignors to Eastman Kodak Company, Rochester, N.Y., a corporation of New Jersey
No Drawing. Original application July 27, 1961, Ser. No. 127,107, now Patent No. 3,222,327. Divided and this application Jan. 15, 1965, Ser. No. 435,108
9 Claims. (Cl. 260—610)

This application is a division of our U.S. application, Ser. No. 127,107, filed July 27, 1961, now Patent No. 3,222,327, entitled, "Peroxide Catalysts and Polymerization Processes Employing the Same."

This invention relates to the polymerization of ethylenically unsaturated polymerizable compounds and particularly to novel catalysts useful for this purpose. In a specific aspect, this invention relates to novel diacyl peroxides and their use as catalysts in the polymerization of ethylenically unsaturated polymerizable compounds. In a more specific aspect, this invention concerns the preparation of polyethylene having a high density, i.e., polyethylene having a density of at least 0.94, in the presence of a novel diacyl peroxide.

It is known that ethylenically unsaturated compounds, and particularly ethylene, can be polymerized at temperatures in the range of about 40° to about 400° C. at high pressures, for example, 10,000 p.s.i. or higher. Catalysts that have been suggested for use in these high pressure processes include oxygen, per-salts, diacyl peroxides, α-substituted diacyl peroxides, metal alkyls and azo compounds. However, but for a few noteworthy exceptions, the diacyl peroxides that are employed as catalysts in the many varied high pressure polymerization reactions are deficient as wholly desirable polymerization catalysts at lower temperatures, for example, 150° C. or lower.

The density of a polymer, and particularly polyethylene, prepared in a high pressure process is particularly dependent upon the temperature of the polymerization. At lower temperatures higher density polyethylene, e.g., polyethylene having a density of at least 0.94, is obtained, while at higher temperatures a lower density polyethylene, e.g., polyethylene having a density less than 0.935, is obtained. Polyethylene having a density of at least 0.94 is particularly valuable due to its improved physical properties including, for example, increased mechanical stiffness which allows the preparation of articles having greater rigidity than those obtained with lower density polyethylene.

The temperatures necessary to prepare polyethylene having a density of at least 0.94 in the high pressure processes are about 150° C., or below and more usually below about 100° C. In order to prepare such polymers in a high pressure process, it is, therefore, necessary that the catalyst decompose very rapidly at temperatures below about 150° C., or more preferably at temperatures below 100° C., to initiate the polymerization reaction. Diacyl peroxides such as lauroyl, butyryl, acetyl and benzoyl peroxides have been used in the high pressure polymerization of polyethylene. Although such peroxides are effective in batch polymerizations where reaction times in the order of several hours to 24 hours are used, they cannot be used in continuous reactors at temperatures below about 150° C. because, at these lower temperatures, the rate of production of free radicals is not rapid enough to sustain the polymerization reaction. For example, lauroyl peroxide is effective in polymerizing ethylene in batch reactions at temperatures of 100° C. and higher, but, at temperatures below 100° C., excessively long times are required for the polymerization reaction and the yields of polyethylene are very low. Alternatively, in a continuous polymerization process, the minimum operating temperature for lauroyl peroxide is about 170° C.

It is evident, from the discussion set forth above, that the state of the art will be greatly enhanced by providing a class of diacyl peroxide catalysts which reach their maximum efficiency at temperatures of about 150° C. or lower, and more preferably at temperatures of 100° C. or below. Likewise, a noteworthy contribution to the art will be a method for the polymerization of ethylenically unsaturated compounds employing such catalysts at temperatures of 150° C. or lower.

Accordingly, it is an object of this invention to provide novel diacyl peroxide catalysts that are effective to polymerize ethylenically unsaturated polymerizable compounds.

Another object of this invention is to provide diacyl peroxide catalysts that are effective to polymerize ethylenically unsaturated compounds at temperatures of 150° C. or below, and more preferably, at temperatures of 100° C. or below.

A further object of this invention is to provide a catalyst that is particularly effective in the preparation of higher density polyethylene, e.g., polyethylene having a density of at least 0.94.

Other objects will become apparent upon an examination and consideration of the specification and claims which follow.

In accordance with this invention, it has been found that ethylenically unsaturated polymerizable compounds, and particularly ethylene, can be polymerized at temperatures within the range of about 30° C. to about 150° C., in the presence of novel diacyl peroxide catalysts, as hereinafter described.

The novel diacyl peroxide catalysts of this invention possess the general formula:

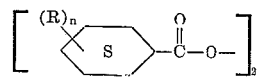

where R is an alkyl, cycloalkyl or alkaryl radical, each desirably containing 1 to 12 carbon atoms, or halogen, and $n$ is an integer from 0 to 2, inclusive. The symbol

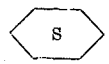

when used in the specification and claims indicates a saturated carbocyclic ring which is, of course, devoid of aromatic unsaturation.

It was completely unexpected that diacyl peroxides having the above formula could be used at low temperatures in the high pressure polymerization of ethylenically unsaturated polymerizable compounds since unsaturated diacyl peroxides of similar structure, for example, benzoyl peroxide, are not effective catalysts under the same conditions of reaction.

The R groups, as indicated above, can be alkyl, cycloalkyl, alkaryl, desirably containing 1 to 12 carbon atoms, or halogen. Suitable R groups, therefore, include methyl, ethyl, propyl, isopropyl, butyl, octyl, decyl, dodecyl, cyclopropyl, cyclobutyl, cyclopentyl, cyclohexyl, cycloheptyl, tolyl, propyl, dipropyl and butyl substituted phenyl, chlorine, iodine, bromine and the like. Hence, examples of the novel diacyl peroxides included within the scope of this invention are bis(cyclohexanecarbonyl)peroxide, bis(3-methylcyclohexanecarbonyl)peroxide, bis(2,3-dibromocyclohexanecarbonyl)peroxide and the like.

In order to obtain maximum catalyst efficiency, a peroxide catalyst must decompose completely during the reaction, but not so rapidly as to decompose in the first few seconds. In discussing the rate of decomposition of peroxides, it is convenient to use a measurement of the "half-life" $\tau$. This is defined as the time required at any given temperature for ½ of the peroxide to decompose. In dilute solution in an inert solvent, most peroxides show a unimolecular decomposition in which the half-life is constant, independent of the initial concentration and of the solvent, and dependent only on temperature. The half-life of the peroxide can be determined in a number of ways. A convenient method is to heat a dilute solution of the catalyst in a solvent such as heptane or toluene for a given length of time at a constant temperature. The unexpectedly rapid rate of decomposition of the novel diacyl peroxides of this invention at low temperature is illustrated by the following table setting forth the half-life τ, at 70° C. in toluene solution at a concentration of 1%, of bis(cyclohexanecarbonyl)peroxide and some conventional prior art peroxide catalysts.

Table 1

| Compound: | Half-life at 70° C., min. |
|---|---|
| Acetyl peroxide | 725 |
| n-butyryl peroxide | 425 |
| Lauroyl peroxide | 438 |
| Benzoyl peroxide | 900 |
| Bis(cyclohexanecarbonyl)peroxide | 1.5 |

It is the rapid rate of decomposition of the novel diacyl peroxides of this invention at low temperatures which makes them eminently suitable for use as low temperature polymerization catalysts.

A convenient method for preparing the novel peroxides of this invention comprises reacting an acyl halide of the formula:

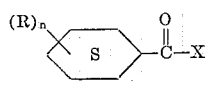

where R and n are as defined hereinbefore, and X is halogen, for example, chlorine or bromine, with an inorganic peroxide such as an alkali or alkaline earth metal peroxide, for example, sodium, calcium or barium peroxide at a relatively low temperature in the range of about −40° C. to +15° C., and more preferably in the range of about −5° C. to about +5° C. While the reaction mixture can be allowed to rise to temperatures up to about 25° C. for example, as a precautionary measure, temperatures in excess of 25° C. are to be avoided. In a preferred mode of preparing these peroxides a toluene solution of the halide is added gradually as, for example, dropwise at a temperature in the range hereinbefore disclosed, to an aqueous solution or slurry of the alkali or alkaline earth metal peroxide. The reaction is continued to completion which is usually a period of not more than 6 hours after mixing the reactants. The resulting peroxide can then be isolated by conventional isolation procedures. Although not essential, it is usually desirable to use a slight excess of inorganic peroxide.

Other reaction media besides water, for example, water-soluble alcohols, such as ethanol, methanol and mixtures of water with these alcohols can be employed to dissolve the inorganic peroxide. Best results are, in general, obtained with water alone. The amount of water employed is subject to wide variation. Twenty to one hundred parts of water per part of sodium peroxide, for example, usually give satisfactory results. Furthermore, any of the conventional aliphatic, cycloaliphatic, or aromatic solvents can be used as the solvent for the halide reactant. Suitable solvents for this purpose include, for example, benzene, toluene, heptane and the like.

The temperatures employed in the polymerization reaction are subject to wide variation and depend upon such variable factors as the monomer employed, the duration of heating, the pressure employed and the type of process, for example, continuous or batch. However, in general, the catalysts of our invention can be used over a temperature range of about 30° C. to about 150° C. In a batch process, temperatures in the range of about 30° to about 70° C. will give satisfactory results while temperatures in the range of about 100° to about 150° C. are generally preferred in a continuous process. The pressure employed is also subject to wide variation and can be any of the conventional pressures employed in the polymerization of ethylenically unsaturated polymerizable compounds although pressures in excess of about 10,000 p.s.i. are desirable, with pressures within the range of about 10,000 to about 50,000 p.s.i. being preferred, particularly with ethylene. The polymerization reaction is carried out in the presence of from five parts per million to 5% by weight of catalyst, based on the monomer to be polymerized, with catalyst concentrations of 10 to 10,000 parts per million being preferred in the case of ethylene. In addition, it is also possible to employ chain transfer agents, for example, hydrogen, aliphatic hydrocarbons and the like or catalyst activators, for example, sulfites, aromatic amines, sulfur dioxide, dimethyl aniline and the like, in the process of this invention.

The novel catalysts of this invention are extremely versatile and can be employed in the polymerization of any one or mixtures of ethylenically unsaturated polymerizable compounds containing at least one $CH_2=C<$ group and particularly those containing a $CH_2=CH-$ group. These catalysts are particularly suited to the polymerization of monoethylenically unsaturated compounds containing 2 to 10 carbon atoms or mixtures thereof. Suitable polymerizable compounds included within the scope of this invention, therefore, are compounds such as ethylene, propylene, butene, decene, styrene, acrylic acid, methyl acrylate, methyl methacrylate, vinyl chloride, vinylidene chloride, butadiene, isoprene and the like.

This invention can be further illustrated by the following examples of preferred embodiments thereof although it will be understood that these examples are included merely for purposes of illustration and are not intended to limit the scope of the invention unless otherwise specifically indicated.

EXAMPLE 1

As already indicated, the novel diacyl peroxides of this invention can be prepared by reacting the corresponding acyl halide with an inorganic peroxide at a relatively low temperature. To illustrate, 0.02 mole of aqueous sodium peroxide [prepared from 0.02 mole of sodium hydroxide in 16 ml. of water and 0.01 mole (1 ml.) of 30% hydrogen peroxide in 12 ml. of water] is stirred with 0.02 mole of cyclohexanecarbonyl chloride for 45 min. at 0° C. The resulting bis(cyclohexanecarbonyl)peroxide is extracted from the aqueous solution with toluene, washed with 5% sodium hydroxide and water, and dried. Titration shows a 75% yield of bis(cyclohexanecarbonyl)peroxide.

EXAMPLE 2

Using the same procedure as in Example 1, bis(3-methylcyclohexanecarbonyl)peroxide is synthesized by reacting 3-methylcyclohexanecarbonyl chloride in toluene with an aqueous solution of sodium peroxide. The resulting toluene solution of the peroxide is purified by washing with water and dried over sodium sulfate.

EXAMPLE 3

Using the procedure of Examples 1 and 2, bis(2,3-dibromocyclohexanecarbonyl)peroxide is synthesized by the reaction 2,3-dibromocyclohexanecarbonyl chloride in toluene with an aqueous solution of sodium peroxide. The resulting toluene solution of the peroxide is purified by washing with water and dried over sodium sulfate.

EXAMPLE 4

The novel diacyl peroxides disclosed herein are extremely effective catalysts for the polymerization of ethylenically unsaturated polymerizable compounds, particularly ethylene, at low temperatures and high pressures. To illustrate this aspect of the invention several runs are carried out as follows:

A 100 cc. steel autoclave, equipped with a magnetic agitator is charged with peroxide catalyst in benzene solution. The autoclave is flushed with ethylene, then pressured with ethylene to 20,000 p.s.i. and the temperature raised to reaction temperature. The reaction pressure is maintained at 20,000 p.s.i. by the addition of compressed gas for a period of 2 hours, after which time the reactor is cooled down and the unreacted ethylene vented. The polymer is removed from the autoclave in the form of a dry, spongy mass.

The results of these runs using the above procedure with the diacyl peroxides of this invention and a prior art peroxide catalyst of similar structure, i.e., benzoyl peroxide, are set forth in Table 2 which follows:

Table 2

| Catalyst | Weight Catalyst, mg. | Reaction Temperature, °C. | Yield, g. | Density | Inherent Viscosity (0.25% in Tetralin at 100° C.) |
|---|---|---|---|---|---|
| Bis(cyclohexanecarbonyl)peroxide | 10 | 45 | 1.7 | 0.943 | 3.56 |
| Bis(cyclohexanecarbonyl)peroxide | 10 | 65 | 2.4 | 0.951 | 2.76 |
| Bis(3-methylcyclohexanecarbonyl)peroxide | 20 | 70 | 3.6 | 0.945 | 2.10 |
| Bis(2,3-dibromocyclohexanecarbonyl)peroxide | 20 | 60 | 4.2 | 0.955 | 1.2 |
| Benzoyl peroxide | 10 | 45 | <0.2 | | |

Upon examination of the above table it is readily apparent that the diacyl peroxides of this invention are extremely effective at low temperatures to form high density polymers, whereas unsaturated peroxides of similar structure, e.g., benzoyl peroxide, are extremely ineffective.

Using the same procedure outlined above or modifying it to operate at atmospheric pressure, other ethylenically unsaturated polymerizable compounds such as styrene, methyl methacrylate and vinyl acetate can be polymerized with the same excellent results. Furthermore, due to the different half-life requirements of batch and continuous processes resulting from the difference in reaction times involved, these same catalysts can be used at temperatures up to about 150° C. in a continuous process with excellent results.

Thus, this invention provides a novel class of diacyl peroxide catalysts that can be used in the polymerization of ethylenically unsaturated polymerizable compounds in high pressure processes at lower temperatures. These catalysts are particularly valuable in the polymerization of ethylene to high density polymers having increased mechanical stiffness and strength making them useful for the fabrication of rigid articles.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A diacyl peroxide having the formula:

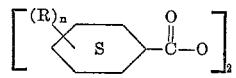

where R is a member selected from the group consisting of alkyl, cycloalkyl, alkaryl and halogen, and $n$ is an integer from 0 to 2, inclusive.

2. The compound of claim 1 where $n$ is 1.

3. The compound of claim 1 where R is an alkyl radical containing 1 to 12 carbon atoms.

4. The compound of claim 1 where R is a cycloalkyl radical containing 1 to 12 carbon atoms.

5. The compound of claim 1 where R is an alkaryl radical containing 1 to 12 carbon atoms.

6. The compound of claim 1 where R is halogen.

7. Bis(cyclohexanecarbonyl)peroxide.

8. Bis(3-methylcyclohexanecarbonyl)peroxide.

9. Bis(2,3-dibromocyclohexanecarbonyl)peroxide.

References Cited

FOREIGN PATENTS 238,435  7/1960  Australia.

LEON ZITVER, *Primary Examiner.*

W. B. LONE, *Assistant Examiner.*